Nov. 11, 1958    L. W. NEWMAN ET AL    2,859,807
PRESSURE-FED OIL FUEL BURNER
Filed May 23, 1955
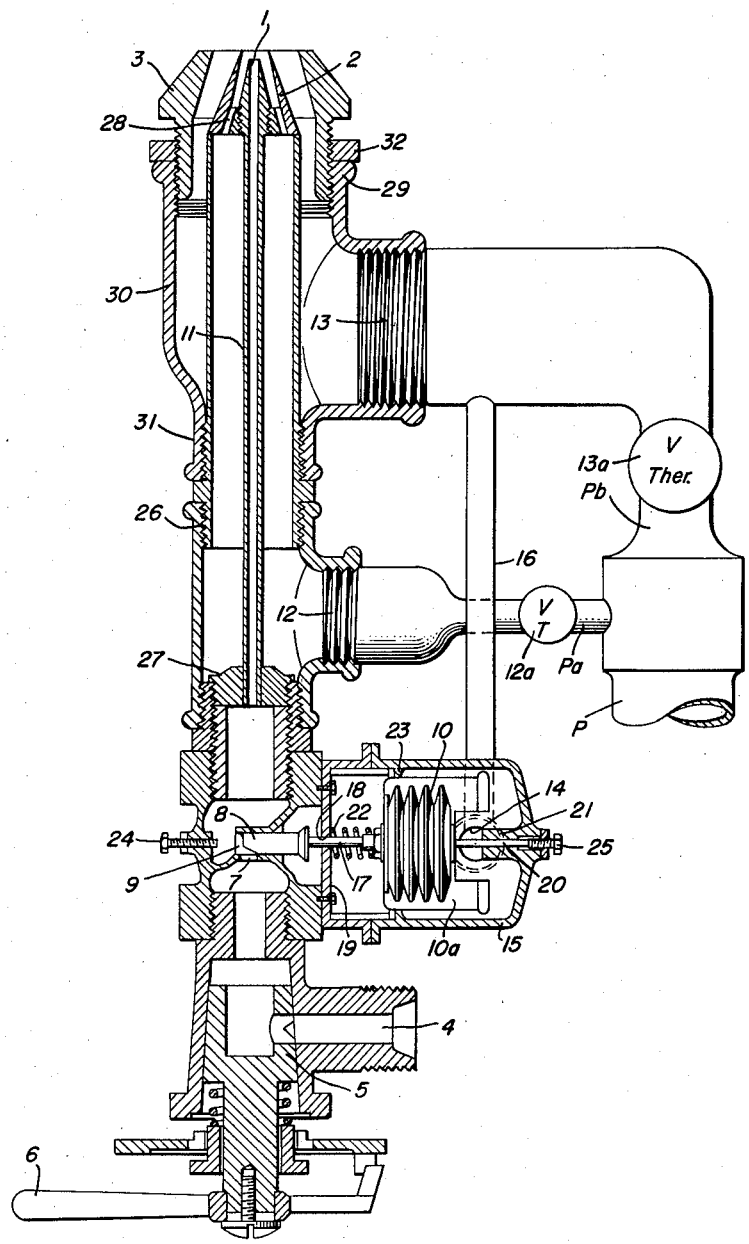
INVENTOR
LESLIE W. NEWMAN
BY ROMUALD DINE
*Ralph A. Stewart*
ATTORNEY

United States Patent Office 2,859,807
Patented Nov. 11, 1958

2,859,807

PRESSURE-FED OIL FUEL BURNER

Leslie William Newman and Romuald Dine, Birmingham, England

Application May 23, 1955, Serial No. 510,276

Claims priority, application Great Britain May 27, 1954

3 Claims. (Cl. 158—42.2)

This invention relates to pressure-fed oil fuel burners such as are used in furnaces.

An object of the invention is to provide a pressure-fed oil fuel burner comprising in combination a fuel nozzle a maintenance air nozzle for supplying air sufficient to maintain a flame at the burner and a booster air nozzle for supplying air for supporting the maximum desired flame at the burner, a manually controllable fuel regulator for regulating a supply of fuel to the burner a thermostatically controlled valve responsive to the temperature in the vicinity of the burner for controlling a supply of air to the booster air nozzle and an automatic fuel control valve for controlling the supply of fuel from the manually controllable fuel regulator to the burner according to the air supplied to the booster air nozzle.

A further object of the invention is to provide a pressure-fed oil fuel burner comprising in combination a fuel nozzle a maintenance air nozzle concentrically surrounding the fuel nozzle for supplying air sufficient to maintain a flame at the burner and a booster air nozzle concentrically surrounding the maintenance air nozzle for supplying air for supporting the maximum desired flame at the burner, preset means for regulating a supply of fuel to the burner, a thermostatically controlled valve responsive to the temperature in the vicinity of the burner for controlling a supply of air to the booster air nozzle a fuel control valve for controlling the supply of fuel from the preset means to the burner pressure responsive means for operating the fuel control valve according to air pressure in the booster air nozzle and means for limiting the maximum opening and closing of the fuel control valve.

Further objects of the invention will appear from the following description and the statement of claim hereinafter appearing.

An embodiment of the invention is illustrated by way of example by the accompanying drawing which is a longitudinal section of a burner including an automatically operated fuel control valve.

In the illustrated embodiment the nozzles of the burner are concentric, the fuel nozzle 1, being surrounded by the maintenance air nozzle 2 which itself is surrounded by the booster air nozzle 3.

Fuel is supplied to the burner assembly by a pipe 4 which leads directly to a fuel regulator 5 which may be manually adjusted by the handle 6. From the fuel regulator 5 fuel passes to an orifice 7 across which a valve member 8 is slidable in a transverse bore 9. The valve member 8, as will be described, is controlled automatically by a flexible metal capsule 10 responsive to air pressure supplied to the booster air nozzle 3. From the bore 9 the fuel is fed to a passage 11 leading to the fuel nozzle 1.

An air supply for the burner is connected to pipe sockets 12 and 13 leading respectively to the maintenance air nozzle and the booster air nozzle. The connection to the socket 12 is provided with an adjustable or fixed choke or throttle valve 12a for limiting the supply of air to the maintenance air nozzle to that necessary just to maintain a flame at the burner in the event of the booster air being completely shut off.

The connection to the socket 13, for the booster air nozzle, is made through a valve 13a controlled by a thermostat responsive to the temperature in the vicinity of the burner. The socket 13, and its connecting pipe, are of such a size as to pass sufficient air to support the maximum desired flame at the burner. The connections to the air supply may conveniently be made by a branched pipe P, of which one limb Pa contains the adjustable or fixed choke or throttle valve 12a and which leads to the socket 12 and the other limb Pb contains the thermostatically controlled valve 13a and leads to the socket 13.

For varying the fuel supply in accordance with the air supply to the booster air nozzle, in order to vary the burner flame in response to the temperature in the vicinity of the burner, a pipe 16 is connected between the air supply pipe entering the socket 13 and a socket 14 in the wall of a chamber 15 housing the flexible metal capsule 10. The valve member 8 is connected by a spindle 17, passing through a gland 18 in the inner end wall 19 of the chamber 15 to one end of the flexible metal capsule 10. The other end of the capsule 10 carries a spindle 20 received in a socket 21 in the outer end wall of the chamber 15. A spring 22 surrounds the spindle 17 between the inner end wall 19 and the capsule 10, tending to collapse the capsule and open the valve 8. Movement of the capsule under pressure variation is guided by a cup shaped guide member 10a secured to the end of the capsule and containing the capsule, and engaging an internal rubbing strip 23 on the wall of the chamber 15.

In use, increase of air pressure in the booster air nozzle produced by opening of the thermostatically controlled valve 13a in response to a fall in the temperature in the vicinity of the burner is transmitted to the chamber 15, and causes the capsule 10 to collapse, so moving the valve member 8 towards the open position. Increased fuel is then allowed to flow to the fuel nozzle, so that the flame is increased in accordance with the demand of the furnace or space heated by the burner.

For limiting the maximum opening and closing of the orifice by the valve member 8, set screws 24 and 25 are provided. The set screw 24 passes through the burner wall in a position to engage the end of the valve member 8 in the closed or nearly closed position. By adjustment of the set screw 24 the maximum movement towards the closed position may be limited. The set screw 25 projects into the socket 21 to abut against the end of the spindle 20. By screwing in the set screw 25 the complete capsule and valve member assembly may be moved towards the closed position, so limiting the maximum opening of the orifice 7.

The maintenance air nozzle 2 is screwed into the burner housing at 26, and the fuel nozzle 1 is supported at its rear end by a screw threaded boss 27 engaging the burner housing and at its forward end by an external screw thread engaging a corresponding screw thread in a perforated disc 28 forming part of the maintenance air nozzle 2. The booster air nozzle 3 is adjustable in the mouth 29 of the main air pipe 30 of the burner, which itself is screwed at its inner end 31 on to the maintenance burner tube. The booster air nozzle 3 is externally screw threaded and engages an internal screw thread in the mouth 29. The position of the nozzle 3 can then be set to give the desired burner performance, and its adjusted position is locked by a locknut 32.

Since the movement of the capsule 10 follows variation in the air pressure in the booster air nozzle, the fuel and booster air supplies are varied in conjunction with each other in response to burner requirements, and a substantially constant temperature may be maintained in the vicinity of the burner. A flame is always maintained by preventing complete closure of the orifice 7 and by the supply of air to the maintenance air nozzle.

We claim:

1. A pressure-fed oil fuel burner system comprising in combination a fuel nozzle, a maintenance-air nozzle concentrically surrounding the fuel nozzle, a booster-air nozzle concentrically surrounding and outwardly spaced from said maintenance air nozzle throughout its entire axial length and providing therewith a fixed, constant discharge area, an air-supply conduit connected to said maintenance nozzle, means in said conduit for restricting the air supplied to said maintenance nozzle to an amount sufficient only to maintain a flame at the minimum heating condition of the burner, a second air-supply conduit supplying air to said booster nozzle, a control valve remote from said nozzle embodied in said second air-supply conduit and being responsive to the temperature of a medium heated by said burner for controlling the amount of air supplied to said booster nozzle inversely with variations in temperature, a fuel-supply connection to said fuel nozzle, a fuel control valve embodied in said fuel-supply connection, pressure-operated means for actuating said fuel control valve, and a conduit connection to said pressure-operated means from said second air-supply conduit adjacent said booster nozzle for controlling said pressure-operated means and thereby operating said fuel control valve to increase the amount of fuel supplied to said fuel nozzle with increase in air-pressure in said booster nozzle.

2. A fuel burner system according to claim 1 wherein said fuel control valve includes a movable valve member actuated by said pressure-operated means, and including an adjustable stop positioned in the path of movement of a part of said valve for limiting the movement of said valve member towards valve-closing position to determine the minimum amount of fuel supplied to said fuel nozzle, and a second adjustable stop positioned in the path of movement of a part of said valve for limiting the movement of said movable valve member in valve-opening direction to determine the maximum amount of fuel supplied to said fuel nozzle.

3. A pressure-fed oil fuel burner system comprising in combination a fuel nozzle, a maintenance-air nozzle concentrically surrounding the fuel nozzle, a booster-air nozzle concentrically surrounding the maintenance air nozzle, an air-supply conduit connected to said maintenance nozzle, means in said conduit for restricting the air supplied to said maintenance nozzle to an amount sufficient only to maintain a flame at the minimum heating condition of the burner, a second air-supply conduit supplying air to said booster nozzle, a control valve embodied in said second air-supply conduit and being responsive to the temperature of a medium heated by said burner for controlling the amount of air supplied to said booster nozzle inversely with variations in temperature, a fuel-supply connection to said fuel nozzle, a fuel control valve embodied in said fuel-supply connection, pressure-operated means for actuating said fuel control valve, and a conduit connection to said pressure-operated means from said second air-supply conduit adjacent said booster nozzle for controlling said pressure-operated means and thereby operating said fuel control valve to increase the amount of fuel supplied to said fuel nozzle with increase in air-pressure in said booster nozzle, said fuel control valve including a movable valve member actuated by said pressure-operated means, an adjustable stop positioned in the path of movement of a part of said valve for limiting the movement of said valve member towards valve-closing position to determine the minimum amount of fuel supplied to said fuel nozzle, a second adjustable stop positioned in the path of movement of a part of said valve for limiting the movement of said movable valve member in valve-opening direction to determine the maximum amount of fuel supplied to said fuel nozzle, a spring acting on said movable valve member tending to move said member in valve-opening direction, and a pressure-responsive capsule embodied in said second adjustable stop for limiting the movement of said member in valve-opening direction, said capsule being responsive to the pressure in said booster nozzle to change the adjustment of the second stop in order to effect increased opening of said fuel control valve with increased pressure in said booster nozzle.

References Cited in the file of this patent

UNITED STATES PATENTS

| | | |
|---|---|---|
| 1,195,667 | Fisher | Aug. 22, 1916 |
| 1,665,145 | Peltz | Apr. 3, 1928 |
| 2,008,143 | Mock | July 16, 1935 |
| 2,047,445 | Stephens | July 4, 1936 |
| 2,157,265 | Pothier | May 9, 1939 |
| 2,175,866 | Arnold | Oct. 10, 1939 |
| 2,200,826 | Johnson | May 14, 1940 |

FOREIGN PATENTS

| | | |
|---|---|---|
| 811,527 | France | Apr. 16, 1937 |
| 497,112 | Great Britain | Dec. 13, 1938 |
| 266,917 | Italy | Aug. 17, 1929 |